No. 852,472. PATENTED MAY 7, 1907.
E. C. TRACEY.
DISPENSING APPARATUS.
APPLICATION FILED JULY 30, 1906.

WITNESSES:
Joseph T. Brennan
Grace C. Gibbons

INVENTOR:
Ernest C. Tracey
By Roberts & Mitchell
attorneys

UNITED STATES PATENT OFFICE.

ERNEST C. TRACEY, OF NEWTON, MASSACHUSETTS, ASSIGNOR TO AMERICAN SODA FOUNTAIN COMPANY, OF BOSTON, MASSACHUSETTS, A CORPORATION OF NEW JERSEY.

DISPENSING APPARATUS.

No. 852,472.  Specification of Letters Patent.  Patented May 7, 1907.

Application filed July 30, 1906. Serial No. 328,321.

*To all whom it may concern:*

Be it known that I, ERNEST C. TRACEY, a citizen of the United States, and a resident of Newton, in the county of Middlesex and State of Massachusetts, have invented new and useful Improvements in Dispensing Apparatus, of which the following is a specification.

My invention relates to apparatus for the compounding and dispensing of mixed drinks especially such as are served at soda fountains and like places and which after being mixed in the shaker have to be strained into the glass from which the customer imbibes.

The strainers heretofore used have not proved entirely satisfactory and a great deal of spattering and spilling and consequently frequent wiping of the dispensing counter have resulted. By my improvements these difficulties are avoided and the dispensing of drinks materially expedited.

Figure 1:
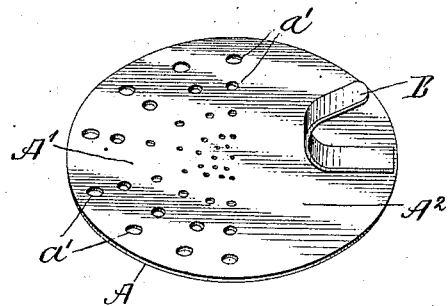
Figure 2:
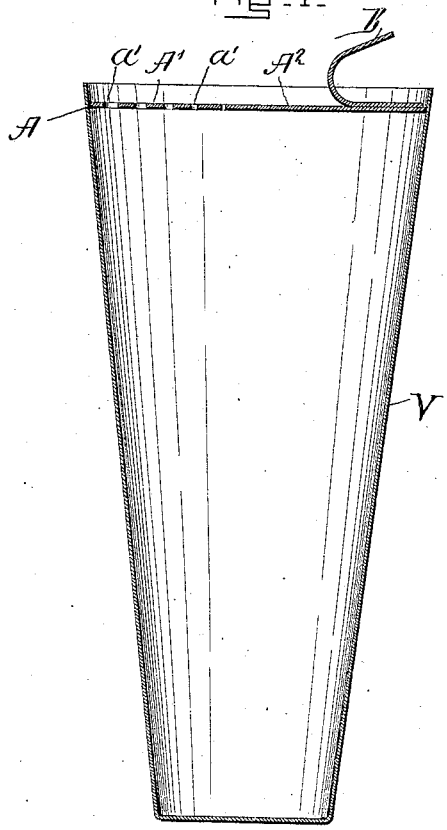

In the drawings hereto annexed which illustrate an embodiment of my invention, Figure 1 is a perspective view of a strainer and Fig. 2 a vertical cross section of the strainer and the dispensing vessel in conjunction.

My strainer consists of a perforated or reticulated disk A, which is preferably of sheet metal, say German silver, and perforated over approximately half its surface. The portion A' is shown in the drawings as the perforated part while the portion A² is imperforate. The perforations a' may be made small or large according to controlling conditions, and as numerous as desired. To the disk A, preferably in the specific instance shown on the imperforate portion A², there is secured the curved clip B which is so shaped and proportioned as to engage snugly the middle finger of the person operating it. The curve of the clip B in order to accommodate and hold fingers of different sizes is preferably an ogee curve which approaches or is inclined to the surface of the disk A at a slight angle.

The vessel V with which the compound drink may have been mixed by shaking the usual way, is preferably made of light sheet metal so as to possess considerable flexibility and elasticity, and the mouth of this vessel is slightly larger in diameter than the disk A so that when the strainer disk A is placed in the vessel V it will slip into it a short distance, say about an eighth of an inch. The elasticity and flexibility of which the material of the vessel V is composed, enables the disk A to make a substantially tight joint even though the latter be not inserted exactly square with the axis of the vessel V. The mode of handling these appliances is as follows: When after mixing by shaking or otherwise, the compounded drink is placed in the vessel V, the attendant picks up the strainer disk A by inserting one of his fingers, say the middle finger, under the curve of the clip B, bringing the next finger into contact with the clip on the outside of its curve. The disk is then clapped into the mouth of the vessel V where it is held by the fingers of the operator whose thumb and other fingers are left free to grasp the vessel V and tip it, pouring out the drink through the strainer holes a'.

These appliances are much quicker to handle than those heretofore in use and as the strainer disk and vessel make tight contact, all liability to spilling and spattering is avoided.

What I claim and desire to secure by Letters Patent is:

A strainer for tumblers and like vessels consisting of a reticulated disk adapted to enter the mouth of a tumbler, and provided with a curved clip, adapted by said curvature to engage a finger of the user between the lower side of the clip and the top of the disk.

Signed by me at Boston, Massachusetts, this 27th day of July, 1906.

ERNEST C. TRACEY.

Witnesses:
JOSEPH T. BRENNAN,
JOSEPHINE H. RYAN.